US009873527B2

(12) United States Patent
DeGaetano et al.

(10) Patent No.: US 9,873,527 B2
(45) Date of Patent: Jan. 23, 2018

(54) SYSTEM AND METHOD TO MAP A THERMAL PROFILE OF A COMPOSITE STRUCTURE USING A THERMOCHROMATIC WITNESS ASSEMBLY

(71) Applicant: The Boeing Company, Chicago, IL (US)

(72) Inventors: Jason A. DeGaetano, Seattle, WA (US); Gary E. Georgeson, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 386 days.

(21) Appl. No.: 14/670,394

(22) Filed: Mar. 26, 2015

(65) Prior Publication Data

US 2016/0282288 A1    Sep. 29, 2016

(51) Int. Cl.
*B64F 5/00* (2017.01)
*B29C 35/02* (2006.01)
(Continued)

(52) U.S. Cl.
CPC ........ *B64F 5/0045* (2013.01); *B29C 35/0288* (2013.01); *B64F 5/60* (2017.01);
(Continued)

(58) Field of Classification Search
CPC ...... B64F 5/0045; B64F 5/60; B29C 35/0288; B29C 73/34; G01K 11/12; G01K 11/125;
(Continued)

(56) References Cited

U.S. PATENT DOCUMENTS 3,744,295 A * 7/1973 Allinikov ............... G01N 21/91
252/960
4,015,465 A * 4/1977 Scott ...................... G01B 11/18
116/212
(Continued)

OTHER PUBLICATIONS

Georgeson et al., "Structural Repair Having Optical Witness and Method of Monitoring Repair Performance", U.S. Appl. No. 13/310,539, filed Dec. 2, 2011, 63 pages.
(Continued)

*Primary Examiner* — Lisa Caputo
*Assistant Examiner* — Philip Cotey

(57) ABSTRACT

There is provided a system and a method to map a thermal profile of a composite structure during curing in at least one of manufacture or repair of the composite structure. The system has a thermochromatic witness assembly having a first series of probes with a thermochromatic material applied either to a composite lay-up, or applied to a removable material adjacent the composite lay-up. The system further has a process assembly with a heat source to cure the thermochromatic witness assembly to form the composite structure. The system further has a light source to activate the thermochromatic material of the first series of probes to prompt an onset of color changes in the thermochromatic material to determine one or more maximum temperatures of the composite structure, to map the thermal profile of the composite structure during curing in at least one of manufacture or repair of the composite structure.

20 Claims, 11 Drawing Sheets

(51) Int. Cl.
  *G01K 11/12* (2006.01)
  *B64F 5/60* (2017.01)
  *B29K 23/00* (2006.01)
  *B29C 73/34* (2006.01)
(52) U.S. Cl.
  CPC .............. *G01K 11/12* (2013.01); *B29C 73/34* (2013.01); *B29K 2023/16* (2013.01)
(58) Field of Classification Search
  CPC ...... G01K 11/14; G01K 11/16; G01K 11/165; G01K 11/18; G01K 11/20; B29K 2023/16
  See application file for complete search history.

(56) References Cited

U.S. PATENT DOCUMENTS

| | | | | |
|---|---|---|---|---|
| 4,445,787 A | * | 5/1984 | Parker | G01K 1/16 30/346.52 |
| 4,812,053 A | * | 3/1989 | Bhattacharjee | G01K 3/04 116/206 |
| 5,573,848 A | * | 11/1996 | Van Praet | B32B 37/06 374/E11.018 |
| 5,614,333 A | * | 3/1997 | Hughen | H01M 2/0267 429/93 |
| 5,817,945 A | * | 10/1998 | Morris | G01L 11/02 73/762 |
| 6,930,820 B1 | * | 8/2005 | Shooks, Jr. | G01M 5/0041 359/325 |
| 8,233,968 B1 | * | 7/2012 | Yannacone, Jr. | A61B 5/015 250/338.1 |
| 8,720,278 B1 | | 5/2014 | Toivola et al. | |
| 2003/0096112 A1 | * | 5/2003 | Ishimura | D01F 1/04 428/373 |
| 2004/0147852 A1 | * | 7/2004 | Brister | A61B 5/015 600/549 |
| 2005/0158540 A1 | * | 7/2005 | Sakai | C09J 7/0207 428/349 |
| 2006/0274812 A1 | * | 12/2006 | Safai | G01N 25/72 374/5 |
| 2007/0259598 A1 | * | 11/2007 | Ribi | C08L 75/04 446/385 |
| 2008/0083286 A1 | * | 4/2008 | Danowski | G01L 1/24 73/774 |
| 2008/0315163 A1 | * | 12/2008 | Schroer | G01K 11/12 252/586 |
| 2009/0143516 A1 | * | 6/2009 | MacDonald | A61B 5/015 524/236 |
| 2009/0219972 A1 | * | 9/2009 | Carlsson | A61B 5/01 374/137 |
| 2009/0278090 A1 | * | 11/2009 | Lucht | B41M 5/284 252/408.1 |
| 2010/0136232 A1 | * | 6/2010 | Walker | B29C 35/049 427/248.1 |
| 2010/0213093 A1 | * | 8/2010 | Iwasaki | B65D 73/0028 206/466 |
| 2011/0123712 A1 | * | 5/2011 | Becker, IV | C09K 9/02 427/162 |
| 2011/0132523 A1 | * | 6/2011 | Evens | B29C 73/10 156/94 |
| 2011/0316712 A1 | * | 12/2011 | McIver | G01M 5/0091 340/665 |
| 2013/0059727 A1 | * | 3/2013 | Tatewaki | B41M 5/305 503/201 |
| 2013/0105743 A1 | * | 5/2013 | Owen | C09D 11/50 252/586 |
| 2014/0138011 A1 | * | 5/2014 | McClure | C09J 5/00 156/64 |
| 2014/0273240 A1 | | 9/2014 | Georgeson et al. | |

OTHER PUBLICATIONS

Georgeson et al., "Monitoring Composite Manufacturing and Repair Processes Using Chromatic Films", U.S. Appl. No. 13/791,207, filed Mar. 8, 2013, 38 pages.

Georgeson et al., "Witness Material and Method for Monitoring the Environmental History of an Object", U.S. Appl. No. 14/259,519, filed Apr. 23, 2014, 17 pages.

Georgeson et al., "Systems and Methods of Monitoring a Thermal Protection System", U.S. Appl. No. 14/337,622, filed Jul. 22, 2014, 20 pages.

* cited by examiner

SYSTEM AND METHOD TO MAP A THERMAL PROFILE OF A COMPOSITE STRUCTURE USING A THERMOCHROMATIC WITNESS ASSEMBLY

BACKGROUND

1) Field of the Disclosure

The disclosure relates generally to systems and methods for manufacturing or repairing composite structures, and more particularly, to systems and methods for mapping or monitoring the thermal profile of a composite structure during the curing process.

2) Description of Related Art

Composite structures may be used in a wide variety of applications, including in the manufacture of aircraft, spacecraft, rotorcraft, watercraft, automobiles, and other vehicles and structures, due to their high strength-to-weight ratios, corrosion resistance and other favorable properties. In particular, in aircraft construction, composite structures may be used to form the tail sections, wings, fuselage and other component parts of the aircraft.

During manufacturing of composite structures or parts, such as composite aircraft structures or parts, it is important to understand and control a thermal profile and a uniform temperature distribution over an entire area of the composite structure or part. If adjacent regions in the composite structure or part heat or cure at different rates, the resin properties may differ between those regions, potentially leading to built-in cure stresses, nonuniform consolidation and suboptimal properties.

Known systems and methods for monitoring the thermal profile of a composite structure or part during curing of early iterations of the composite structure or part and tooling exist. However, such known systems and methods may require significant effort, cost and time in order to optimize both the composite structure or part design and the tool design.

One such known method to monitor a thermal profile of a composite structure or part includes the use of thermocouples located on or implanted in the composite part or tool to monitor temperature. However, the thermocouples may only measure the temperature at specific point locations and may not measure out-of-range temperature information at other locations. Moreover, multiple thermocouples may be required on large or complex parts, and may result in increased time, labor and difficulty to install. In addition, the thermocouples typically remain on the composite structure or part during manufacturing and are removed after manufacturing. This may produce mark-off, such as resin pockets, resin "bumps", wrinkles, or geometry issues, on the resulting manufactured structure or part. Further, the thermocouples may have less than desired reliability, if the thermocouples do not work properly or if they experience wire breakage.

Accordingly, there is a need in the art for an improved system and method for mapping or monitoring a thermal profile of a composite structure or part during the curing process in the manufacture or repair of the composite structure or part, that provide advantages over known systems and methods.

SUMMARY

Example implementations of this disclosure provide an improved system and method to map or monitor a thermal profile of a composite structure or part during the curing process in the manufacture or repair of the composite structure or part. As discussed in the below detailed description, embodiments of the improved method and system may provide significant advantages over existing systems and methods for mapping the thermal history or profile of composite structures or parts.

In one embodiment there is provided a system to map a thermal profile of a composite structure during curing in at least one of manufacture of the composite structure, or repair of the composite structure. The system comprises a thermochromatic witness assembly. The thermochromatic witness assembly comprises a first series of probes comprising a thermochromatic material either applied to a composite lay-up, or applied to a removable material adjacent the composite lay-up.

The system further comprises a process assembly with a heat source configured to cure the thermochromatic witness assembly to form the composite structure. The system further comprises a light source configured to activate the thermochromatic material of the first series of probes to prompt an onset of color changes in the thermochromatic material to determine one or more maximum temperatures of the composite structure, in order to map the thermal profile of the composite structure during curing in at least one of manufacture of the composite structure, or repair of the composite structure.

In another embodiment there is provided a method to map a thermal profile of a composite structure during curing in at least one of manufacture of the composite structure, or repair of the composite structure manufacture. The method comprises the step of applying a first series of probes comprising a thermochromatic material either to a composite lay-up on a tool, or to a removable material adjacent the composite lay-up, to form a thermochromatic witness assembly.

The method further comprises the step of curing with heat the thermochromatic witness assembly to form the composite structure. The method further comprises the step of activating the thermochromatic material of the first series of probes with a light source to prompt an onset of color changes in the thermochromatic material to determine one or more maximum temperatures of the composite structure, in order to map the thermal profile of the composite structure during curing in at least one of manufacture of the composite structure, or repair of the composite structure.

In another embodiment there is provided a method to map a thermal profile of an aircraft composite part during curing in at least one of manufacture of the aircraft composite part, or repair of the aircraft composite part. The method comprises the step of verifying a tool thermal profile of a tool configured for receiving a composite lay-up or configured for receiving the composite lay-up with a removable material adjacent the composite lay-up.

The method further comprises the step of applying a first series of probes comprising a thermochromatic material and a second series of probes comprising the thermochromatic material either to the composite lay-up on the tool, or to the removable material adjacent the composite lay-up, to form a thermochromatic witness assembly. The method further comprises the step of processing the thermochromatic witness assembly, including using heat to cure the thermochromatic witness assembly, to form the aircraft composite part.

The method further comprises the step of activating the thermochromatic material of the first series of probes with an ultraviolet (UV) light source to prompt an onset of color changes in the thermochromatic material of the first series of probes to determine one or more maximum temperatures of the composite part, in order to map the thermal profile of the aircraft composite part during curing in at least one of manufacture of the aircraft composite part, or repair of the aircraft composite part. The method further comprises the step of activating the thermochromatic material of the second series of probes with the light source, the second series of probes configured to provide a time-temperature profile of the aircraft composite part. The method further comprises the step of recording with a camera one or more images of the thermochromatic material of the first series of probes and the second series of probes. The method further comprises the step of removing the removable material, if the removable material is present in the thermochromatic witness assembly.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

The figures shown in this disclosure represent various aspects of the embodiments presented, and only differences will be discussed in detail.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and fully convey the scope of the disclosure to those skilled in the art.

Figure 1:
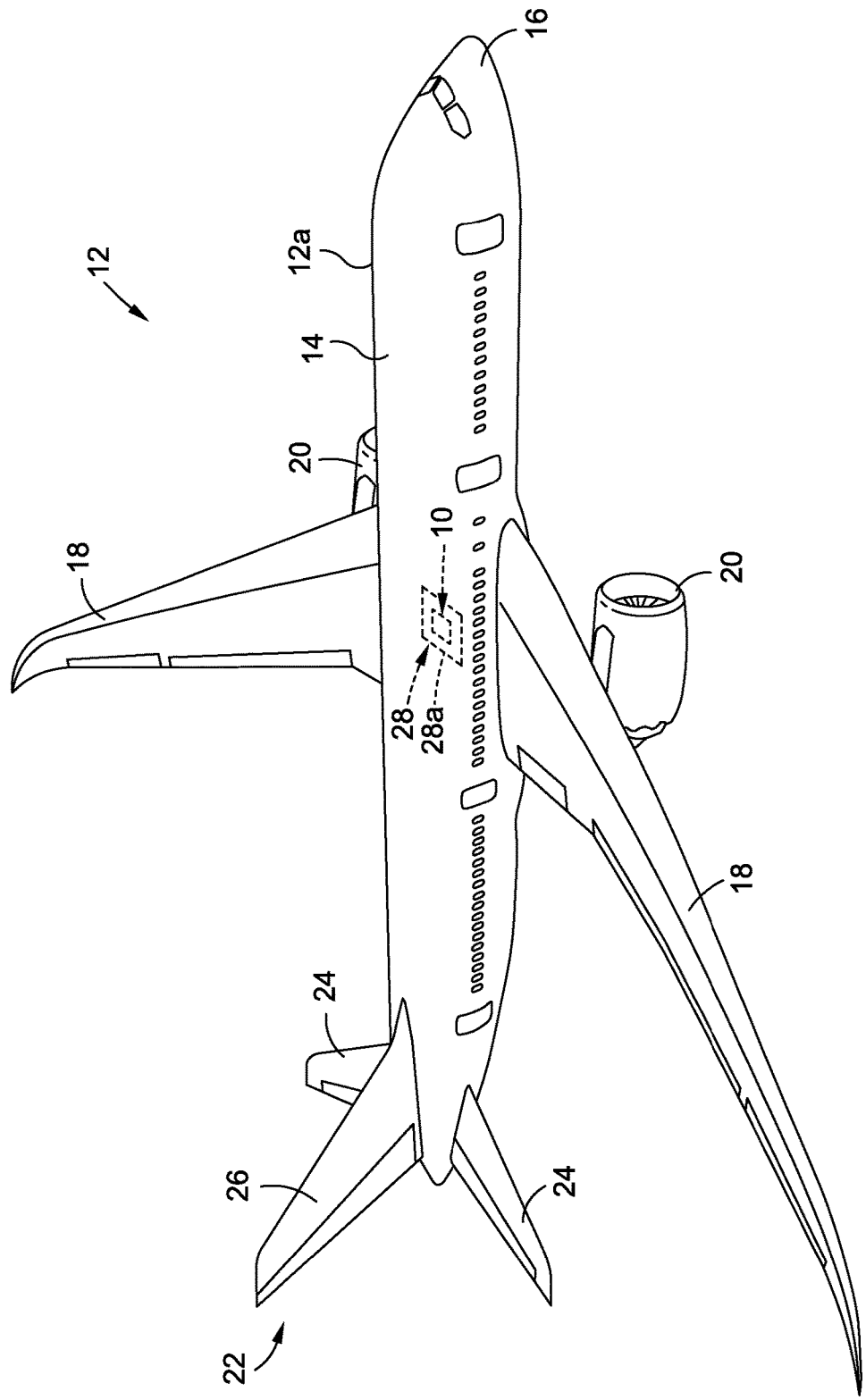
FIG. 1 is a diagrammatic representation of a perspective view of an air vehicle that may incorporate one or more composite structures that may be thermally mapped with an embodiment of a system and a method of the disclosure.

Now referring to the Figures, FIG. 1 is a diagrammatic representation of a perspective view of an air vehicle 12, such as in the form of aircraft 12a, that may incorporate one or more composite structures 28 that may be thermally mapped with an embodiment of a system 10 (see FIG. 4) and a method 200 (see FIG. 9) or a method 250 (see FIG. 10) of the disclosure. As further shown in FIG. 1, the air vehicle 12, such as in the form of aircraft 12a, comprises a fuselage 14, a nose 16, wings 18, engines 20, and an empennage 22 comprising horizontal stabilizers 24 and a vertical stabilizer 26.

As further shown in FIG. 1, the air vehicle 12, such as in the form of aircraft 12a, comprises one or more composite structures 28, such as in the form of an aircraft composite part 28a, for which a thermal profile 62 (see FIG. 4) may be mapped or monitored using the system 10 (see FIG. 4), the method 200 (see FIG. 9), and the method 250 (see FIG. 10), of the disclosure. In an exemplary embodiment, the composite structure 28 (see FIG. 1) comprises the aircraft composite part 28a (see FIG. 1) on the air vehicle 12 (see FIG. 1), such as aircraft 12a (see FIG. 1). In other embodiments (not shown), the composite structure 28 (see FIG. 1) may comprise a rotorcraft composite structure on a rotorcraft, a watercraft composite structure on a watercraft, or another suitable composite structure 28.

Figure 2:
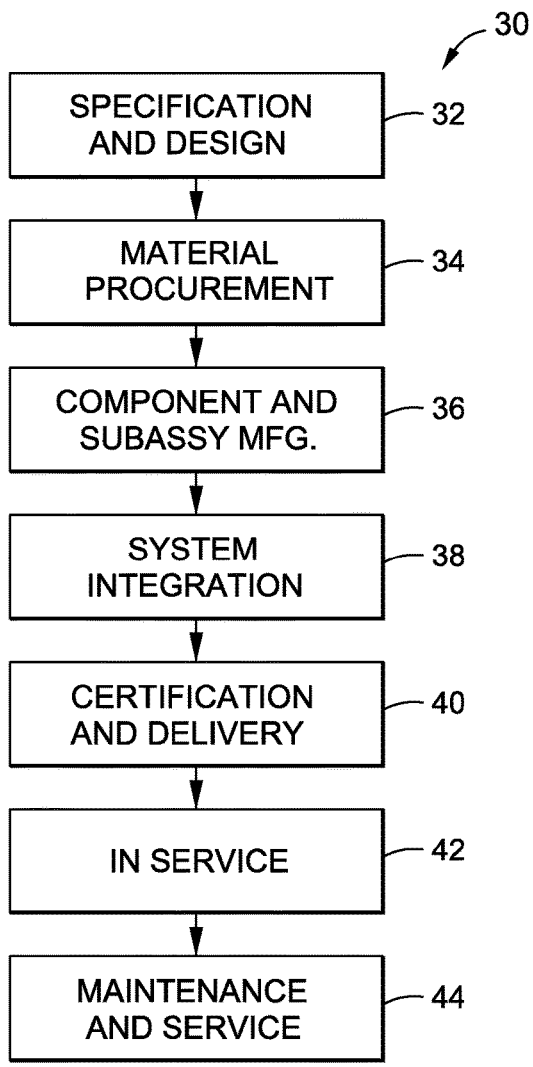
FIG. 2 is a flow diagram of an aircraft manufacturing and service method.
Figure 3:
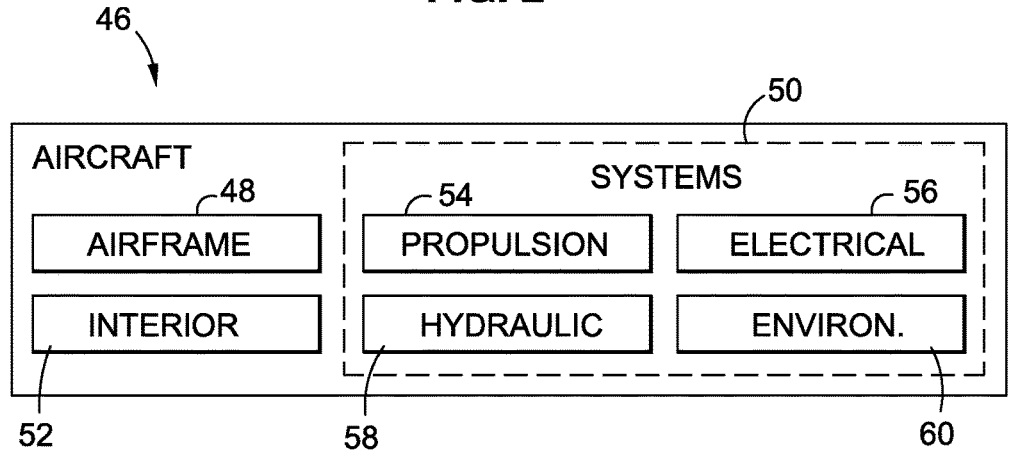
FIG. 3 is an illustration of a block diagram of an aircraft.

FIG. 2 is a flow diagram of an embodiment of an aircraft manufacturing and service method 30. FIG. 3 is an illustration of a functional block diagram of an embodiment of an aircraft 46. Referring to FIGS. 2-3, embodiments of the disclosure may be described in the context of the aircraft manufacturing and service method 30, as shown in FIG. 2, and the aircraft 46, as shown in FIG. 3. During preproduction, the exemplary aircraft manufacturing and service method 30 (see FIG. 2) may include specification and design 32 (see FIG. 2) of the aircraft 46 (see FIG. 3) and material procurement 34 (see FIG. 2). During manufacturing, component and subassembly manufacturing 36 (see FIG. 2) and system integration 38 (see FIG. 2) of the aircraft 46 (see FIG. 3) takes place. Thereafter, the aircraft 46 (see FIG. 3) may go through certification and delivery 40 (see FIG. 2) in order to be placed in service 42 (see FIG. 2). While in service 42 (see FIG. 2) by a customer, the aircraft 46 (see FIG. 3) may be scheduled for routine maintenance and service 44 (see FIG. 2), which may also include modification, reconfiguration, refurbishment, and other suitable services.

Each of the processes of the aircraft manufacturing and service method 30 (see FIG. 2) may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may include an airline, leasing company, military entity, service organization, and other suitable operators.

As shown in FIG. 3, the aircraft 46 produced by the exemplary aircraft manufacturing and service method 30 may include an airframe 48 with a plurality of systems 50 and an interior 52. As further shown in FIG. 3, examples of the systems 50 may include one or more of a propulsion system 54, an electrical system 56, a hydraulic system 58, and an environmental system 60. Any number of other systems may be included. Although an aerospace example is shown, the principles of the disclosure may be applied to other industries, such as the automotive industry.

Methods and systems embodied herein may be employed during any one or more of the stages of the aircraft manufacturing and service method 30 (see FIG. 2). For example, components or subassemblies corresponding to component and subassembly manufacturing 36 (see FIG. 2) may be fabricated or manufactured in a manner similar to components or subassemblies produced while the aircraft 46 (see FIG. 3) is in service 42 (see FIG. 2). Also, one or more apparatus embodiments, method embodiments, or a combination thereof, may be utilized during component and subassembly manufacturing 36 (see FIG. 2) and system integration 38 (see FIG. 2), for example, by substantially expediting assembly of or reducing the cost of the aircraft 46 (see FIG. 3). Similarly, one or more of apparatus embodiments, method embodiments, or a combination thereof, may be utilized while the aircraft 46 (see FIG. 3) is in service 42 (see FIG. 2), for example and without limitation, to maintenance and service 44 (see FIG. 2).

Figure 4:
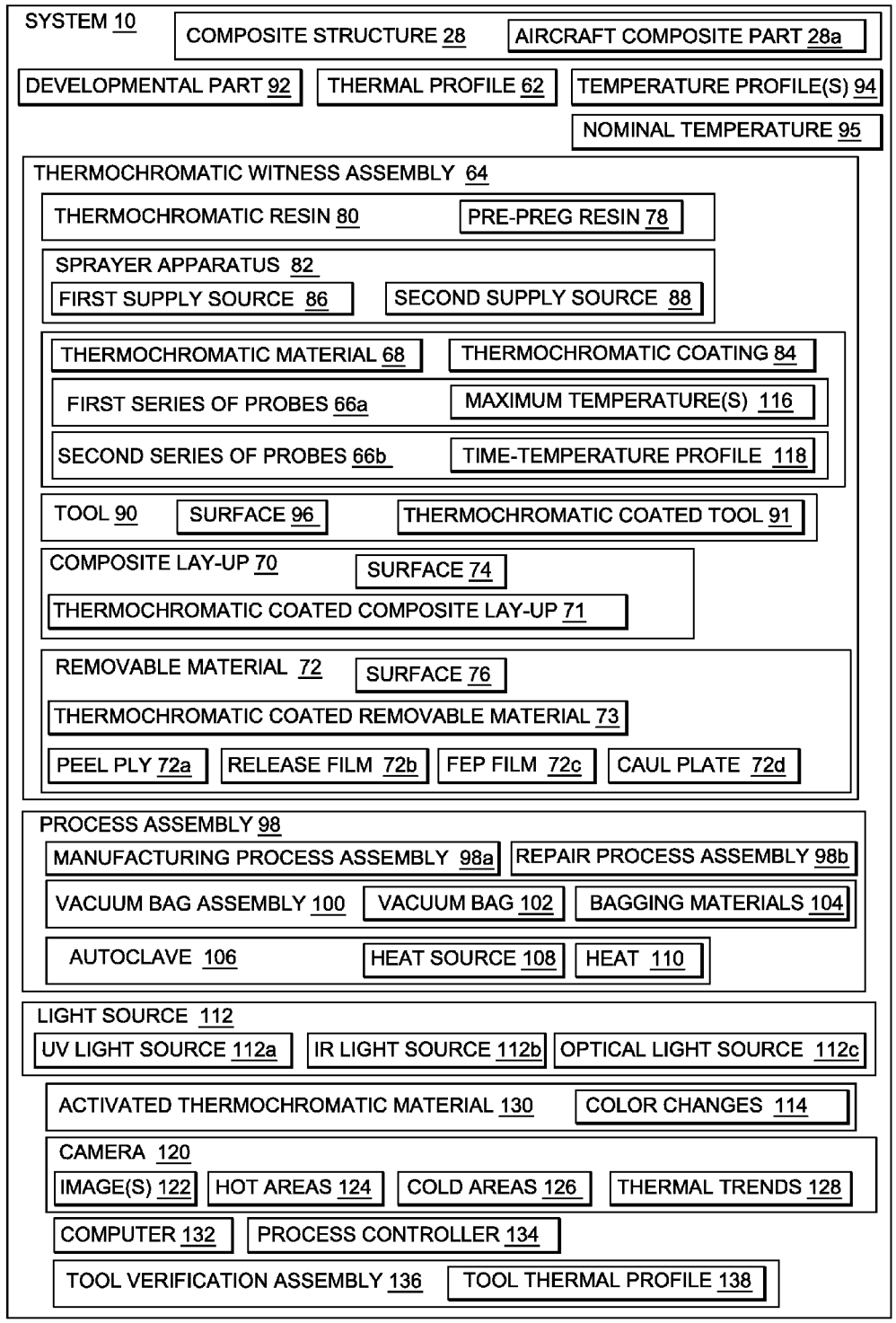
FIG. 4 is an illustration of a functional box diagram showing an embodiment of the system of the disclosure.

Referring to FIG. 4, in an embodiment of the disclosure, there is provided a system 10 to map a thermal profile 62 of a composite structure 28 during curing in at least one of manufacture of the composite structure, or repair of the composite structure. "At least one of" may mean only manufacture of the composite structure 28, or only repair of the composite structure 28, or a combination of manufacture of the composite structure 28 and repair of the composite structure 28. FIG. 4 is an illustration of a functional box diagram showing an embodiment of the system 10 of the disclosure. As shown in FIG. 4, the system 10 comprises a composite structure 28, such as an aircraft composite part 28*a*. Although a composite structure 28 (see FIG. 4) is preferable, metal structures or a combination of composite and metal structures may also be used.

As shown in FIG. 4, the system 10 further comprises a thermochromatic witness assembly 64. The thermochromatic witness assembly 64 (see FIG. 4) comprises a first series of probes 66*a* (see FIG. 4) comprising a thermochromatic material 68 (see FIG. 4). The thermochromatic witness assembly 64 (see FIG. 4) may further comprise a second series of probes 66*b* (see FIG. 4) comprising the thermochromatic material 68 (see FIG. 4). The thermochromatic witness assembly 64 (see FIG. 4) may further comprise, as needed, additional series of probes comprising the thermochromatic material 68 (see FIG. 4).

The thermochromatic material 68 (see FIG. 4) may comprise thermochromatic probes or dyes tailored to activate at specific thermal or time-temperature ranges. When the thermochromatic material 68 (see FIG. 4) is activated by exposure to the temperatures to which it has been tailored, the probe or dye undergoes fluorescent shifts. When illuminated by a light source 112 (see FIG. 4), discussed in further detail below, of a suitable wavelength, the fluorescent shifts in the thermochromatic material 68 (see FIG. 4) become visible, manifesting themselves as color change(s) 114 (see FIG. 4) or color intensity.

In one embodiment, as shown in FIG. 4, the thermochromatic witness assembly 64 comprises the first series of probes 66*a*, or alternatively, the first series of probes 66*a* and the second series of probes 66*b*, applied to a composite lay-up 70, and preferably to a surface 74 of the composite lay-up 70. The composite lay-up 70 may preferably comprise uncured composite plies 69, or other suitable composite plies, that are preferably cut and laid up via a known lay-up process and using a known lay-up apparatus. The lay-up apparatus may be an automated lay-up apparatus or a manual lay-up apparatus.

In another embodiment, as shown in FIG. 4, the thermochromatic witness assembly 64 comprises the first series of probes 66*a*, or alternatively, the first series of probes 66*a* and the second series of probes 66*b*, applied to the removable material 72 that is positioned adjacent to the composite lay-up 70, and preferably to a surface 76 of the removable material 72. The removable material 72 (see FIG. 4) preferably comprises at least one of a peel ply 72*a* (see FIG. 4), a release film 72*b* (see FIG. 4), a fluorinated ethylene propylene (FEP) film 72*c* (see FIG. 4), a caul plate 72*d* (see FIG. 4), or another suitable removable material 72. "At least one of" may mean either only a peel ply 72*a* (see FIG. 4), only a release film 72*b* (see FIG. 4), only a fluorinated ethylene propylene (FEP) film 72*c* (see FIG. 4), only a caul plate 72*d* (see FIG. 4), or only another suitable removable material 72, or any combination of a peel ply 72*a* (see FIG. 4), a release film 72*b* (see FIG. 4), a fluorinated ethylene propylene (FEP) film 72*c* (see FIG. 4), a caul plate 72*d* (see FIG. 4), and another suitable removable material 72.

The peel ply 72*a* (see FIG. 4) may comprise a woven fabric made of nylon, polyester fibers, or other suitable woven fabric materials. The peel ply 72*a* (see FIG. 4) is preferably peeled from the surface of the composite structure 28 (see FIGS. 1, 4) and removed following curing, and may be used to give texture to the surface of the composite structure 28 (see FIGS. 1, 4) or protect the surface of the composite structure 28 (see FIGS. 1, 4) from contaminants following a vacuum bagging process.

The release film 72*b* (see FIG. 4) may comprise a thin, elastic plastic film that facilitates pulling various bagging materials 104 (see FIG. 4) from a vacuum bag assembly 100 (see FIG. 4) off the composite structure 28 (see FIG. 1). The selection of the release film 72*b* (see FIG. 4) may be determined based on the resin system being used with a composite lay-up 70 (see FIG. 4), the temperature and pressure of the cure cycle, the shape of the composite structure 28 (see FIG. 4) to be cured and the amount of resin bleed that is desired. The fluorinated ethylene propylene (FEP) film 72*c* may comprise a type of release film 72*b*. The release film 72*b* and FEP film 72*c* may both preferably be removed following cure of the composite structure 28 (see FIG. 1), so that there is no contamination of the composite structure 28 (see FIG. 1), such as the aircraft composite part 28*a* (see FIG. 1).

The caul plate 72*d* (see FIG. 4) or caul sheet may comprise smooth plates, free of surface defects, and may be made of metal materials, thin composite materials, or elastomeric materials, and may be the same size and shape as the composite lay-up, and may be used in contact with the composite lay-up during the curing process. The caul plate 72*d* (see FIG. 4) transmits normal pressure and temperature, and provides a smooth surface on the finished composite structure 28 (see FIG. 4). After the curing process, the caul plate 72*d* (see FIG. 4) or caul sheet is preferably removed from the composite lay-up 70 (see FIG. 4)), so that there is no contamination of the composite structure 28 (see FIG. 1), such as the aircraft composite part 28*a* (see FIG. 1).

The first series of probes 66*a* (see FIG. 4) of the thermochromatic material 68 (see FIG. 4), or alternatively, the first series of probes 66*a* (see FIG. 4) and the second series of probes 66*b* (see FIG. 4) of the thermochromatic material 68 (see FIG. 4), may be applied either via spraying, or via mixing into a pre-preg resin 78 (see FIG. 4) of the composite lay-up 70 to form a thermochromatic resin 80 (see FIG. 4), or via another suitable application process.

As shown in FIG. 4, the system 10 may comprise a sprayer apparatus 82 to spray or apply the first series of probes 66a of the thermochromatic material 68, or to spray or apply both the first series of probes 66a and the second series of probes 66b of the thermochromatic material 68. The first series of probes 66a (see FIG. 4) of the thermochromatic material 68 (see FIG. 4) may be supplied to the sprayer apparatus 82 (see FIG. 4) from a first supply source 86 (see FIG. 4), and the second series of probes 66b (see FIG. 4) of the thermochromatic material 68 (see FIG. 4) may be supplied to the sprayer apparatus 82 (see FIG. 4) from a second supply source 88 (see FIG. 4). The removable material 72 (see FIG. 4), such as, for example, in the form of peel ply 72a (see FIG. 4), is preferably sprayed with the thermochromatic material 68 (see FIG. 4) from the sprayer apparatus 82 (see FIG. 4), to form a thermochromatic coating 84 (see FIG. 4) on the removable material 72 (see FIG. 4) and to obtain a thermochromatic coated removable material 73 (see FIG. 4). The thermochromatic material 68 (see FIG. 4) may also be applied directly to the composite lay-up 70 (see FIG. 4) that is laid up on a tool 90 (see FIG. 4) or mold, and preferably is applied directly to a surface 74 (see FIG. 4) of the composite lay-up 70 (see FIG. 4) after the composite lay-up 70 (see FIG. 4) is laid up, but before it is processed in a vacuum bag assembly 100 (see FIG. 4) and in an autoclave 106 (see FIG. 4) and cured. The composite lay-up 70 (see FIG. 4) laid up on the tool 90 (see FIG. 4) and sprayed with the thermochromatic material 68 (see FIG. 4) from the sprayer apparatus 82 (see FIG. 4) forms the thermochromatic coating 84 (see FIG. 4) on the composite lay-up 70 (see FIG. 4) and obtains a thermochromatic coated composite lay-up 71 (see FIG. 4). The thermochromatic material 68 (see FIG. 4) may also be applied directly to a surface 96 (see FIG. 4) of the tool 90 (see FIG. 4) or mold to verify a tool thermal profile 138 (see FIG. 4), discussed in further detail below, of the tool 90 (see FIG. 4). The tool 90 (see FIG. 4) sprayed with the thermochromatic material 68 (see FIG. 4) from the sprayer apparatus 82 (see FIG. 4) forms the thermochromatic coating 84 (see FIG. 4) on the tool 90 (see FIG. 4) and obtains a thermochromatic coated tool 91 (see FIG. 4). The thermochromatic material 68 (see FIG. 4) may be sprayed in a pattern, over the entire surface that is sprayed, or over a portion of the surface that is sprayed. The thermochromatic material 68 (see FIG. 4) may be sprayed at ambient temperature. Preferably, one layer or coating of the thermochromatic material 68 is sprayed on one side, or a portion of one side, of the material to be coated, and preferably the visual or viewable side is sprayed or coated. With the thermochromatic resin 80 (see FIG. 4), one or both sides, or portions of one or both sides, of the material to be coated may be coated with the thermochromatic resin 80 (see FIG. 4).

Figure 5A:
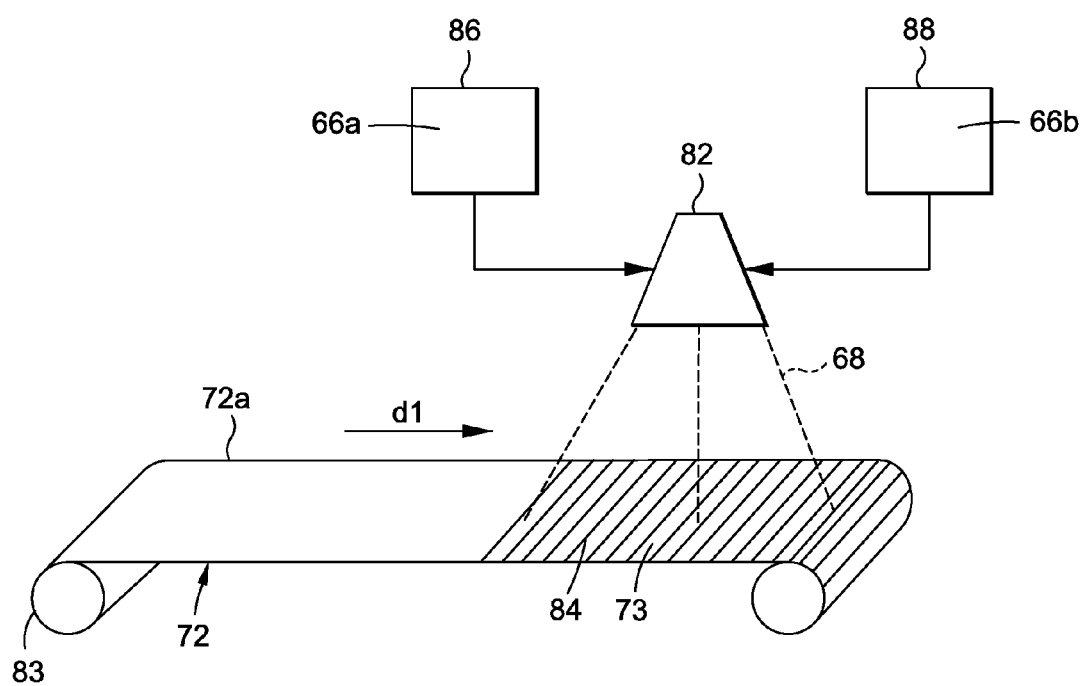
FIG. 5A is a diagrammatic representation of a schematic diagram of a removable material sprayed with a thermochromatic material from a sprayer apparatus.

In one embodiment, as shown in FIG. 5A, the thermochromatic material 68 is applied to the removable material 72. FIG. 5A is a diagrammatic representation of a schematic diagram of the removable material 72, such as, for example, in the form of peel ply 72a, sprayed with the thermochromatic material 68 from the sprayer apparatus 82, to form the thermochromatic coating 84 on the removable material 72 and to obtain the thermochromatic coated removable material 73. As shown in FIG. 5A, the first series of probes 66a of the thermochromatic material 68 may be supplied to the sprayer apparatus 82 from the first supply source 86, and the second series of probes 66b of the thermochromatic material 68 may be supplied to the sprayer apparatus 82 from the second supply source 88. As shown in FIG. 5A, the removable material 72 may be formed in a roll, attached to a roller apparatus 83, and rolled in a direction ($d_1$) toward the sprayer apparatus 82. The removable material 72 (see FIG. 5A) that is coated with the thermochromatic material 68 (see FIG. 5A) is then preferably laid up adjacent to the composite lay-up 70 (see FIG. 6A), which is preferably laid up on the tool 90 or mold, to form the thermochromatic witness assembly 64. Alternatively, the removable material 72, such as in the form of peel ply 72a, may already be coated, or previously coated, with the thermochromatic material 68, and supplied in rolled configuration or in another suitable configuration. For in-process applications, the embodiment shown in FIG. 5A allows for validation of the composite structure 28 curing, which may eliminate the need for process control tests.

Figure 5B:
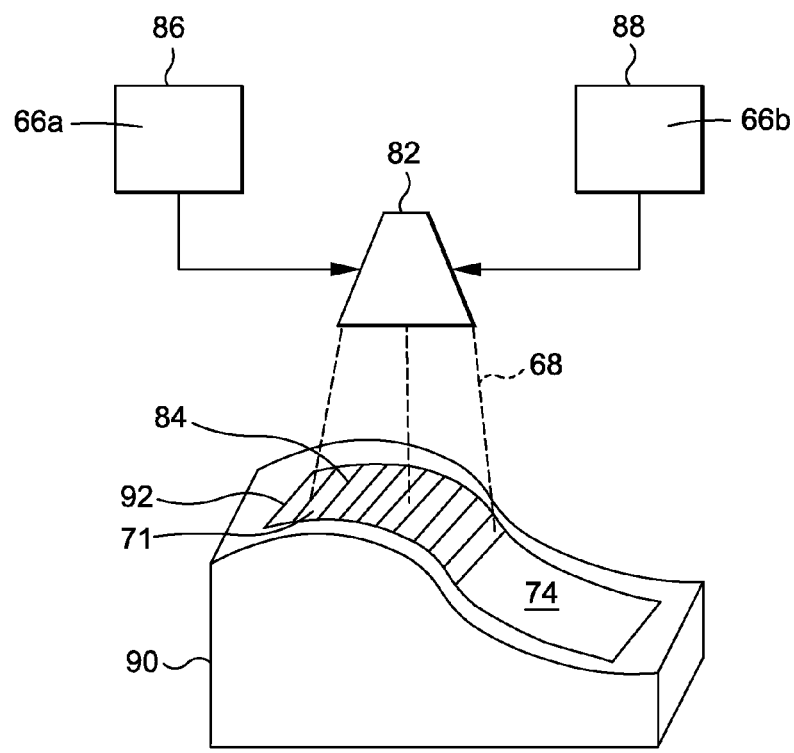
FIG. 5B is a diagrammatic representation of a schematic diagram of a composite lay-up on a tool sprayed with a thermochromatic material from a sprayer apparatus.

In another embodiment, as shown in FIG. 5B, the thermochromatic material 68 is applied directly to the composite lay-up 70 that is laid up on the tool 90 or mold, and preferably is applied directly to the surface 74 of the composite lay-up 70 after the composite lay-up 70 is laid up but before it is processed in the vacuum bag assembly 100 (see FIG. 4) and in the autoclave 106 (see FIG. 4) and cured. FIG. 5B is a diagrammatic representation of a schematic diagram of the composite lay-up 70 laid up on the tool 90 and sprayed with the thermochromatic material 68 from the sprayer apparatus 82 to form the thermochromatic coating 84 on the composite lay-up 70 and to obtain the thermochromatic coated composite lay-up 71. As further shown in FIG. 5B, the first series of probes 66a of the thermochromatic material 68 may be supplied to the sprayer apparatus 82 from the first supply source 86, and the second series of probes 66b of the thermochromatic material 68 may be supplied to the sprayer apparatus 82 from the second supply source 88.

As further shown in FIG. 5B, the composite lay-up 70 that is coated with the thermochromatic material 68 may be in the form of a developmental part 92. The thermochromatic material 68 (see FIG. 5B) may be applied directly to the developmental part 92 via either spraying, or mixing with the pre-preg resin 78 (see FIG. 4) to form the thermochromatic resin 80 (see FIG. 4). By applying the thermochromatic material 68 (see FIG. 5B) directly to the composite lay-up 70 (see FIG. 5B), such as in the form of developmental part 92 (see FIG. 5B), it is possible to quickly determine the thermal profile 62 (see FIG. 4), such as temperature profile(s) 94 (see FIG. 4), of the composite lay-up 70 (see FIGS. 4, 5B), such as in the form of developmental part 92 (see FIGS. 4, 5B), and to guide the design of the tool 90 (see FIGS. 4, 5B) and future process parameters.

For in-process applications, the embodiment shown in FIG. 5B allows for validation of the composite structure 28 curing, which may eliminate the need for process control tests and may also aid and expedite material review board (MRB) processes, and may solve heating issues. The thermochromatic material 68 (see FIG. 4) may also be applied outside of the aircraft composite part 28a (see FIGS. 1, 4) areas for in-process monitoring and validation of the cure cycle. In this case, the thermochromatic material 68 (see FIG. 4) is still applied to the composite structure 28 but would be outside the area trimmed to become the composite part, such as the aircraft composite part 28a (see FIG. 1), and would be on an area that is trimmed.

Figure 5C:
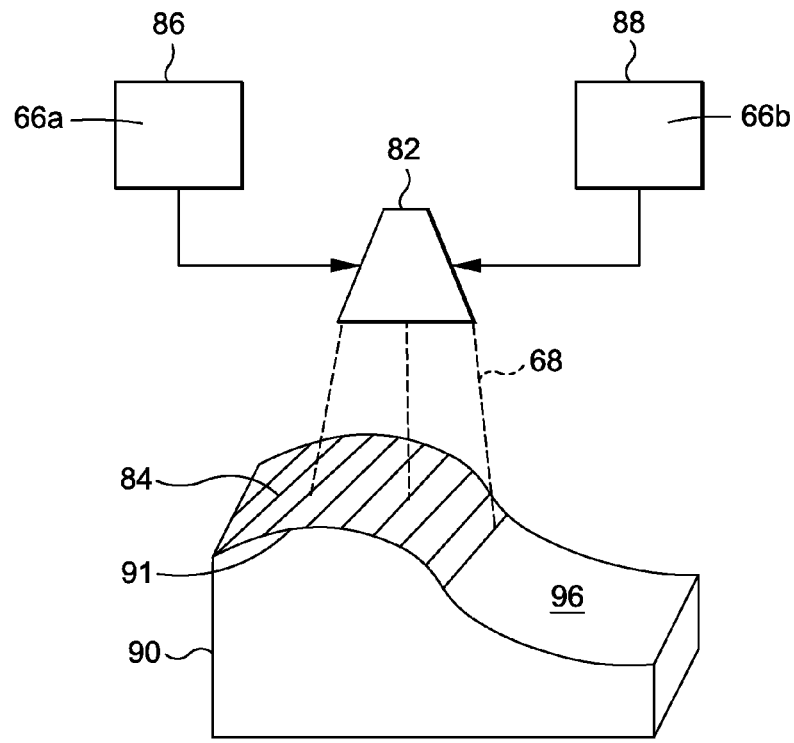
FIG. 5C is a diagrammatic representation of a schematic diagram of a tool sprayed with a thermochromatic material from a sprayer apparatus.

In another embodiment, as shown in FIG. 5C, the thermochromatic material 68 is applied directly to the surface 96 of the tool 90 or mold to verify a tool thermal profile 138

(see FIG. 4), discussed in further detail below, of the tool 90. FIG. 5C is a diagrammatic representation of a schematic diagram of the tool 90 sprayed with the thermochromatic material 68 from the sprayer apparatus 82 to form the thermochromatic coating 84 on the tool 90 and to obtain the thermochromatic coated tool 91. As further shown in FIG. 5C, the first series of probes 66a of the thermochromatic material 68 may be supplied to the sprayer apparatus 82 from the first supply source 86, and the second series of probes 66b of the thermochromatic material 68 may be supplied to the sprayer apparatus 82 from the second supply source 88.

Figure 6A:
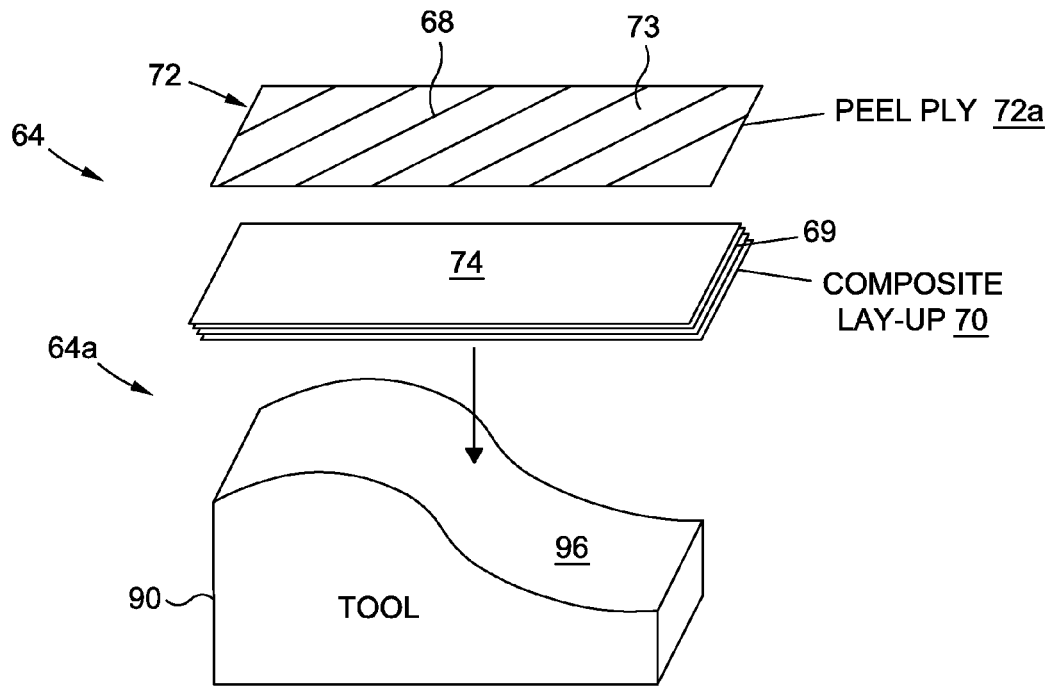
FIGS. 6A-6E are diagrammatic representations of various exemplary thermochromatic witness assemblies that may be used in the system of the disclosure.
Figure 6B:
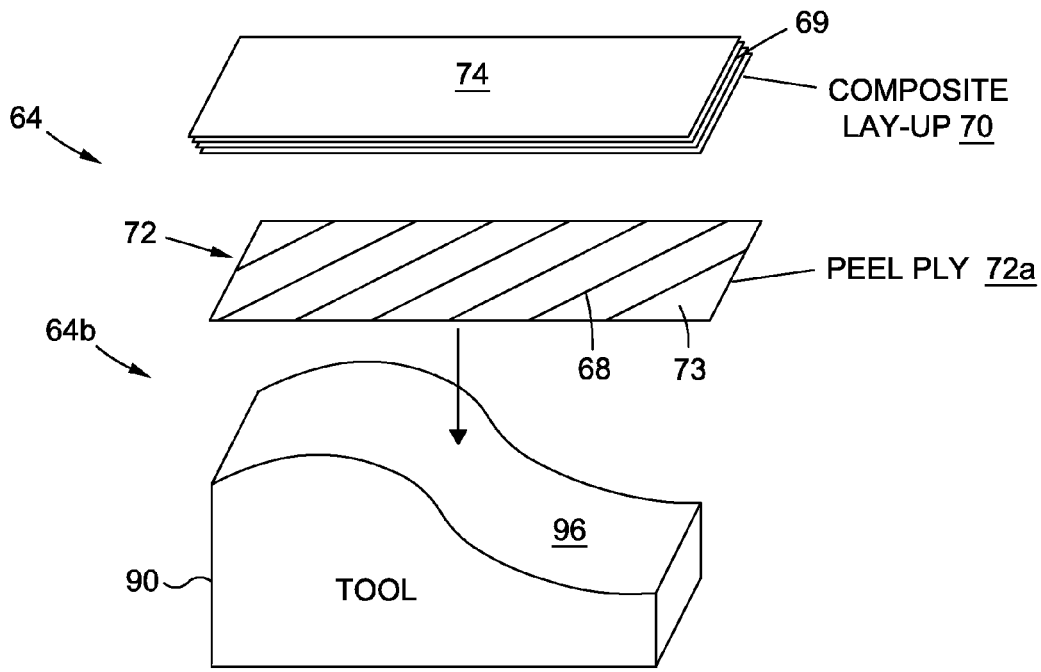

FIGS. 6A-6E are diagrammatic representations of various exemplary thermochromatic witness assemblies 64, without limitation, that may be used in the system 10 of the disclosure. FIG. 6A shows a thermochromatic witness assembly 64, such as in the form of thermochromatic witness assembly 64a, comprising the composite lay-up 70 configured and intended to be laid up on the tool 90, with the thermochromatic coated removable material 73, such as a peel ply 72a coated with the thermochromatic material 68, configured and intended to be laid up over the surface 74 of the composite lay-up 70. FIG. 6B shows a thermochromatic witness assembly 64, such as in the form of thermochromatic witness assembly 64b, comprising the thermochromatic coated removable material 73, such as a peel ply 72a coated with the thermochromatic material 68, configured and intended to be laid up over the surface 96 of the tool 90 and the composite lay-up 70 configured and intended to be laid up over the thermochromatic coated removable material 73, such as a peel ply 72a coated with the thermochromatic material 68.

The thermochromatic material 68 (see FIG. 4) may be applied to the peel ply 72a (see FIG. 4), or in the pre-preg resin 78 (see FIG. 4) of the peel ply 72a (see FIG. 4), to thermally map the thermal profile 62 (see FIG. 4) on developmental parts or production parts. The peel ply 72a (see FIG. 4) is examined, photographed with a camera 120 (see FIG. 4) under a light source 112 (see FIG. 4), such as a UV light source 112a (see FIG. 4) for documentation, and then removed from the composite structure 28, such as the aircraft composite part 28a. Results may be used to modify and improve the composite structure 28, such as the aircraft composite part 28a (see FIG. 4), the tool 90 (see FIG. 4), or other processes.

Figure 6C:
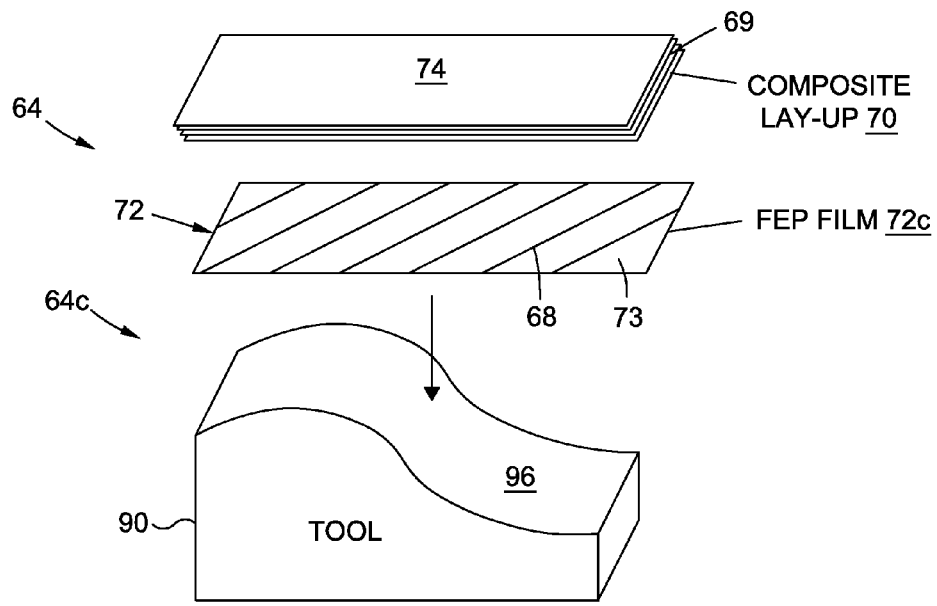
Figure 6D:
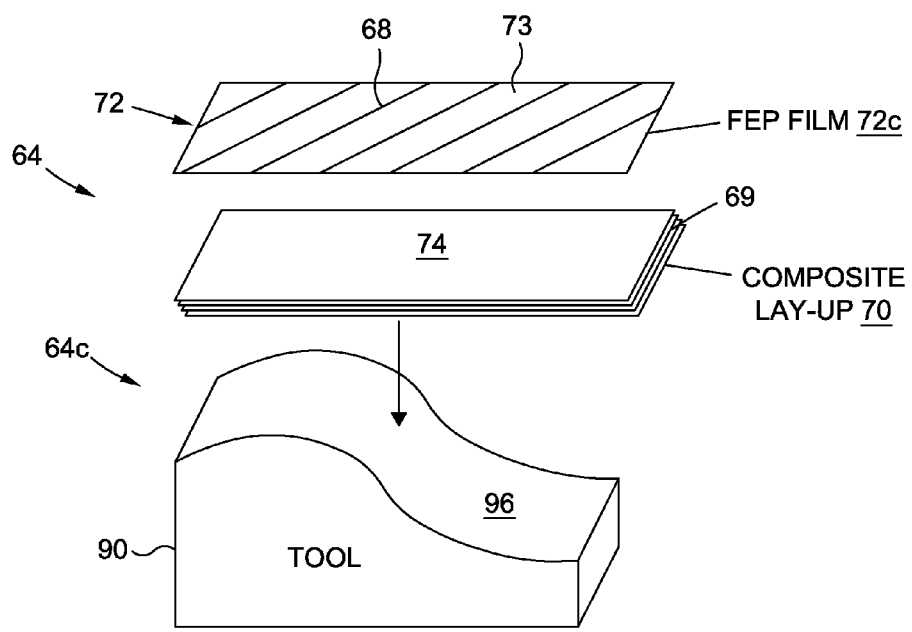

FIG. 6C shows a thermochromatic witness assembly 64, such as in the form of thermochromatic witness assembly 64c, comprising the thermochromatic coated removable material 73, such as the fluorinated ethylene propylene (FEP) film 72c coated with the thermochromatic material 68, configured and intended to be laid up over the surface 96 of the tool 90 and the composite lay-up 70 configured and intended to be laid up over the thermochromatic coated removable material 73, such as the FEP film 72c coated with the thermochromatic material 68. FIG. 6D shows a thermochromatic witness assembly 64, such as in the form of thermochromatic witness assembly 64d, comprising the composite lay-up 70 configured and intended to be laid up on the tool 90 with the thermochromatic coated removable material 73, such as the FEP film 72c coated with the thermochromatic material 68, configured and intended to be laid up over the surface 74 of the composite lay-up 70.

The thermochromatic material 68 (see FIG. 4) may be applied to the FEP film 72c (see FIG. 4) or to the release film 72b (see FIG. 4), that are preferably removed after examination and documentation. The activated thermochromatic material 130 (see FIG. 4) applied to the FEP film 72c (see FIG. 4) or to the release film 72b (see FIG. 4) may be inspected on the tool 90 (see FIG. 4), or alternatively, on the composite structure 28, such as the aircraft composite part 28a, under the light source 112 (see FIG. 4), such as the UV light source 112a (see FIG. 4), photographed for documentation, and then removed.

Figure 6E:
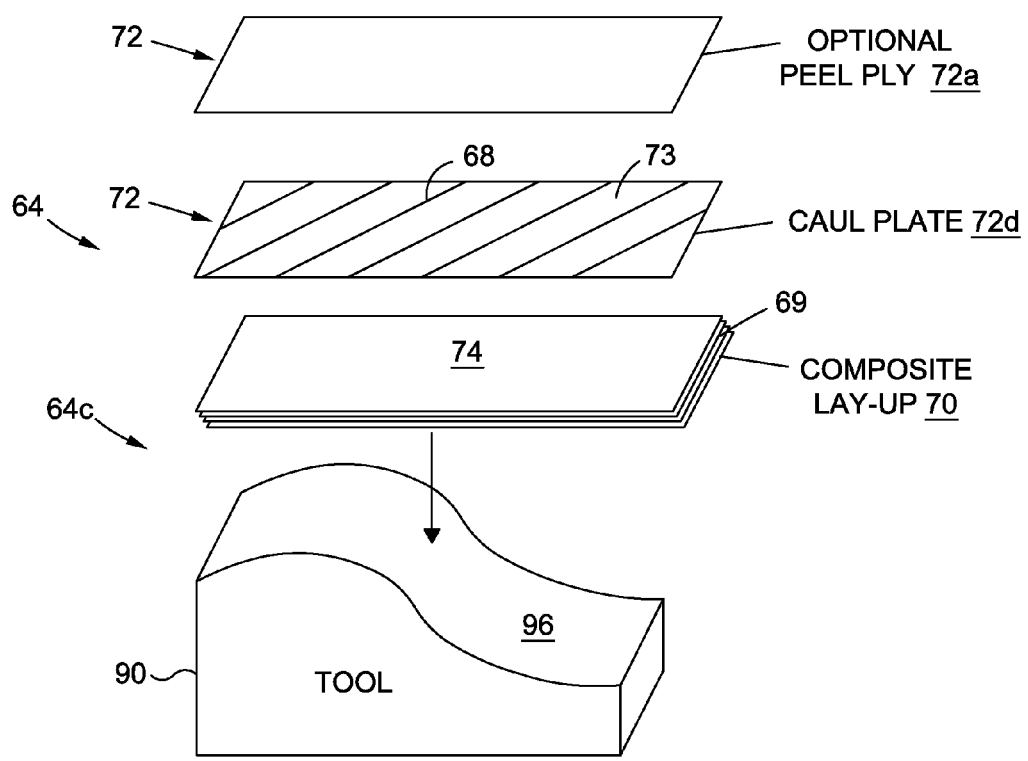

FIG. 6E shows a thermochromatic witness assembly 64, such as in the form of thermochromatic witness assembly 64e, comprising the composite lay-up 70 configured and intended to be laid up on the tool 90 with the thermochromatic coated removable material 73, such as the caul plate 72d coated with the thermochromatic material 68, configured and intended to be laid up over the surface 74 of the composite lay-up 70. The caul plate 72d (see FIG. 6E) may be used in place of a peel ply 72a (see FIG. 6A) or in addition to a peel ply 72a (see FIG. 6E). If the caul plate 72d (see FIG. 6E) is used in addition to the peel ply 72a (see FIG. 6E), the peel ply 72a (see FIG. 6E) may be laid up over the caul plate 72d (see FIG. 6E) or the caul plate 72d may be laid up over the peel ply 72a, and whichever is adjacent to the composite lay-up 70 (see FIG. 6E) is preferably coated with the thermochromatic material 68 (see FIG. 6E).

The thermochromatic material 68 (see FIG. 4) may be applied to the caul plate 72d (see FIG. 4), where a caul plate is used, and the caul plate 72d (see FIG. 4) is preferably removed after examination and documentation. The activated thermochromatic material 130 (see FIG. 4) applied to the caul plate 72d (see FIG. 4) may be inspected on the tool 90 (see FIG. 4), or alternatively, on the composite structure 28, such as the aircraft composite part 28a, under the light source 112 (see FIG. 4), such as the UV light source 112a (see FIG. 4), photographed for documentation, and then removed.

Figure 7:
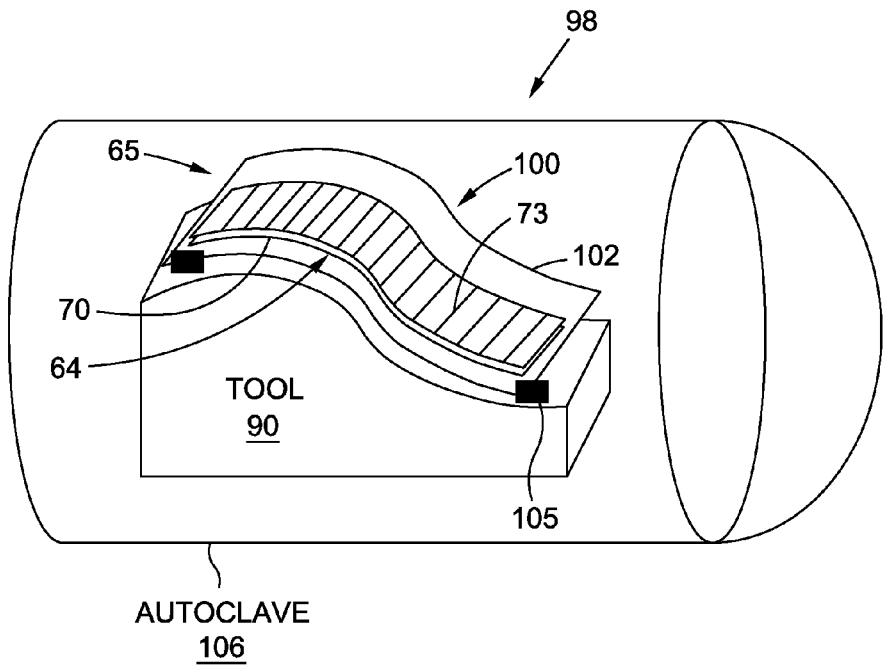
FIG. 7 is a diagrammatic representation of a bagged thermochromatic witness assembly in an autoclave.

As shown in FIGS. 4 and 7, the system 10 further comprises a process assembly 98 for processing the thermochromatic witness assembly 64, such as in the form of a vacuum bag assembly 100. FIG. 7 is a diagrammatic representation of a bagged thermochromatic witness assembly 65 of the vacuum bag assembly 100 and in an autoclave 106. The process assembly 98 (see FIGS. 4, 7) preferably comprises a manufacturing process assembly 98a (see FIG. 4) or a repair process assembly 98b (see FIG. 4). The process assembly 98 (see FIG. 4) may comprise the vacuum bag assembly 100 (see FIGS. 4, 7) having a vacuum bag 102 (see FIGS. 4, 7) and bagging materials 104 (see FIG. 4). The vacuum bag 102 (see FIG. 7) may be placed over the thermochromatic witness assembly 64 (see FIG. 7) and any additional bagging materials 104 (see FIG. 4) and is preferably sealed to the tool 90 (see FIG. 7) using any suitable sealing devices, such as sealant tape 105 (see FIG. 7) to form the bagged thermochromatic witness assembly 65 (see FIG. 7). The bagged thermochromatic witness assembly 65 (see FIG. 7) may then preferably be placed in the autoclave 106 (see FIG. 7), in an oven, or in another suitable heating apparatus having a heat source 108 (see FIG. 4).

The process assembly 98 (see FIG. 4) may further comprise the heat source 108 (see FIG. 4) which is configured to cure the thermochromatic witness assembly 64 (see FIG. 4) with heat 110 (see FIG. 4) to form the composite structure 28 (see FIG. 4). The vacuum bag assembly 100 (see FIGS. 4, 7) with the thermochromatic witness assembly 64 (see FIGS. 4, 7) is preferably subjected to an elevated temperature and pressure, and the vacuum bag 102 (see FIGS. 4, 7) is preferably evacuated, which causes the vacuum bag 102 (see FIGS. 4, 7) to apply compaction pressure to the composite lay-up 70 (see FIGS. 4, 7). During curing in the autoclave 106 (see FIGS. 4, 7), pressure in the autoclave 106

(see FIGS. 4, 7) assists in compacting and consolidating the composite lay-up 70 (see FIGS. 4, 7).

After the composite structure 28 (see FIG. 4) is cured, the composite structure 28 (see FIG. 4) is removed from the autoclave 106 (see FIGS. 4, 7), oven or other suitable heating apparatus, and is preferably removed from the tool 90 (see FIGS. 4, 7). The cured composite structure 28 (see FIG. 4) is then placed in close proximity to a light source 112 (see FIGS. 4, 8), so that the thermochromatic material 68 (see FIGS. 4, 7) of the thermochromatic witness assembly 64 (see FIGS. 4, 7) may be activated.

Figure 8:
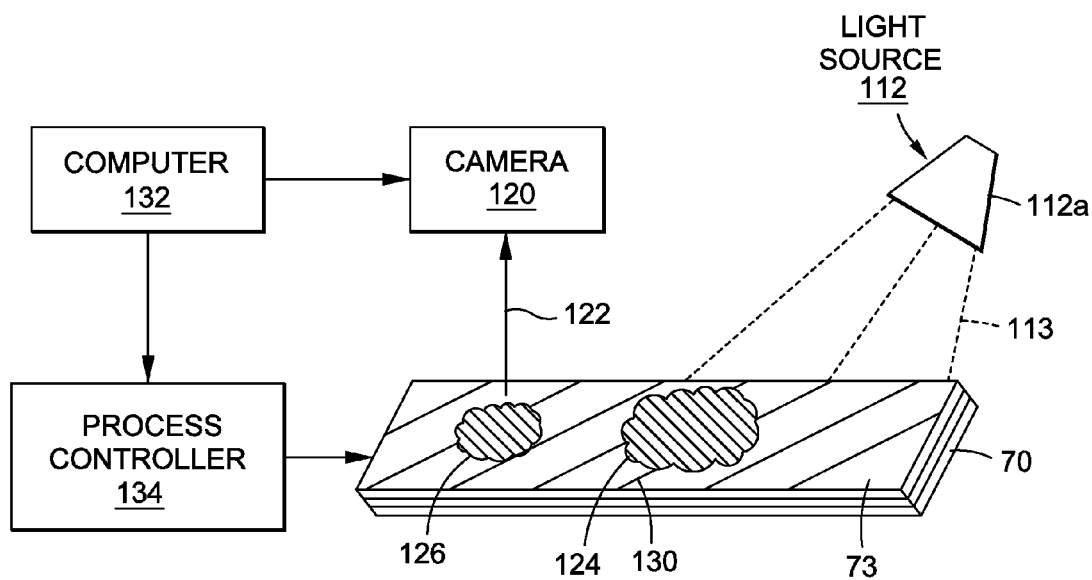
FIG. 8 is a diagrammatic representation of an activated thermochromatic material illuminated by a light source.

As shown in FIGS. 4 and 8, the system 10 further comprises the light source 112 configured to activate the thermochromatic material 68. FIG. 8 is a diagrammatic representation of an activated thermochromatic material 130 illuminated by illumination 113 from the light source 112. The light source 112 preferably comprises at least one of an ultraviolet (UV) light source 112a (see FIGS. 4, 8), an infrared (IR) light source 112b (see FIG. 4), an optical light source 112c (see FIG. 4), and another suitable light source 112. "At least one of" means either only an ultraviolet (UV) light source 112a (see FIGS. 4, 8), only an infrared (IR) light source 112b (see FIG. 4), only an optical light source 112c (see FIG. 4), or only another suitable light source 112, or any combination of an ultraviolet (UV) light source 112a (see FIGS. 4, 8), an infrared (IR) light source 112b (see FIG. 4), an optical light source 112c (see FIG. 4), and another suitable light source 112. The light source 112 (see FIGS. 4, 8) illuminates the thermochromatic material 68 (see FIG. 4) with illumination 113 (see FIG. 8) of light of a preselected wavelength, such as in the ultraviolet (UV) or infrared (IR) range.

The light source 112 (see FIGS. 4, 8) is configured to activate the thermochromatic material 68 (see FIG. 4) of the first series of probes 66a (see FIG. 4) to prompt an onset of color changes 114 (see FIG. 4) in the thermochromatic material 68 (see FIG. 4). The color changes 114 (see FIG. 4) in the thermochromatic material 68 (see FIG. 4) are preferably used to determine one or more maximum temperature (s) 116 (see FIG. 4) of the composite structure 28 (see FIG. 4), in order to map the thermal profile 62 (see FIG. 4) of the composite structure 28 (see FIG. 4) during manufacture or repair of the composite structure 28 (see FIG. 4). The color changes 114 (see FIG. 4) may indicate that the composite structure 28 (see FIG. 4) has been subjected to temperatures outside the desired range of values. Thus, the thermochromatic material 68 (see FIG. 4) acts as a "witness" that indicates out-of-range process parameters that may be used to assess the suitability of the formed composite structure 28, or to adjust the process parameters.

In the embodiment where the thermochromatic witness assembly 64 (see FIG. 4) comprises the second series of probes 66b (see FIG. 4), the light source 112 (see FIG. 4) is configured to activate the thermochromatic material 68 (see FIG. 4) of the second series of probes 66b (see FIG. 4) to provide a time-temperature profile 118 (see FIG. 4). The second series of probes 66b (see FIG. 4) may be used to determine the relative change between a temperature at which the first series of probes 66a (see FIG. 4) are activated and a temperature at which the second series of probes 66b (see FIG. 4) are activated. The first series of probes 66a (see FIG. 4) and the second series of probes 66b (see FIG. 4) of the thermochromatic material 68 (see FIG. 4) may be used to map and monitor process parameters, such as temperature, during the cure cycle to determine if the temperature is outside of a predetermined range of values.

As shown in FIGS. 4 and 8, the system 10 may further comprise a camera 120 to record one or more images 122 of the activated thermochromatic material 130 comprising the thermochromatic material 68 (see FIG. 4) of the first series of probes 66a (see FIG. 4) and/or the second series of probes 66b (see FIG. 4) after activation with the light source 112. The camera 120 (see FIG. 4) may comprise a digital camera or another suitable recording device. The activated thermochromatic material 130 (see FIG. 8) is preferably inspected under or in close proximity to the light source 112 (see FIGS. 4, 8) to inspect for hot areas 124 (see FIGS. 4, 8), cold areas 126 (see FIGS. 4, 8), and thermal trends 128 (see FIG. 4). Results of any hot areas 124 (see FIGS. 4, 8), cold areas 126 (see FIGS. 4, 8), and thermal trends 128 (see FIG. 4) may be photographed with the camera 120 (see FIGS. 4, 8) and documented.

As further shown in FIGS. 4 and 8, a computer 132 may be used to store the one or more images 122 in a memory. Based on the one or more images 122 (see FIGS. 4, 8) recorded by the camera 120 (see FIGS. 4, 8), the computer 132 (see FIGS. 4, 8) may provide information to a process controller 134 (see FIGS. 4, 8) that may adjust process parameters, such as temperature, to improve the process assembly 98 (see FIG. 4), the tool 90 (see FIG. 4), or the composite structure 28 (see FIG. 4).

As shown in FIG. 4, the system 10 may further comprise a tool verification assembly 136 configured to verify a tool thermal profile 138 of the tool 90. The tool verification assembly 136 comprises the tool 90 configured for receiving the composite lay-up 70 or the composite lay-up 70 with the removable material 72 adjacent the composite lay-up 70. The tool verification assembly 136 further comprises the first series of probes 66a comprising the thermochromatic material 68, or the first series of probes 66a and the second series of probes 66b comprising the thermochromatic material 68, applied directly to a surface 96 of the tool 90 or mold. The tool verification assembly 136 further comprises the light source 112 configured to activate the thermochromatic material 68 of the first series of probes 66a, or the first series of probes 66a and the second series of probes 66b, to verify the tool thermal profile 138 of the tool 90.

The thermochromatic material 68 (see FIG. 4) may also be applied outside of the aircraft composite part 28a (see FIGS. 1, 4) areas for in-process monitoring and validation of the cure cycle.

Figure 9:
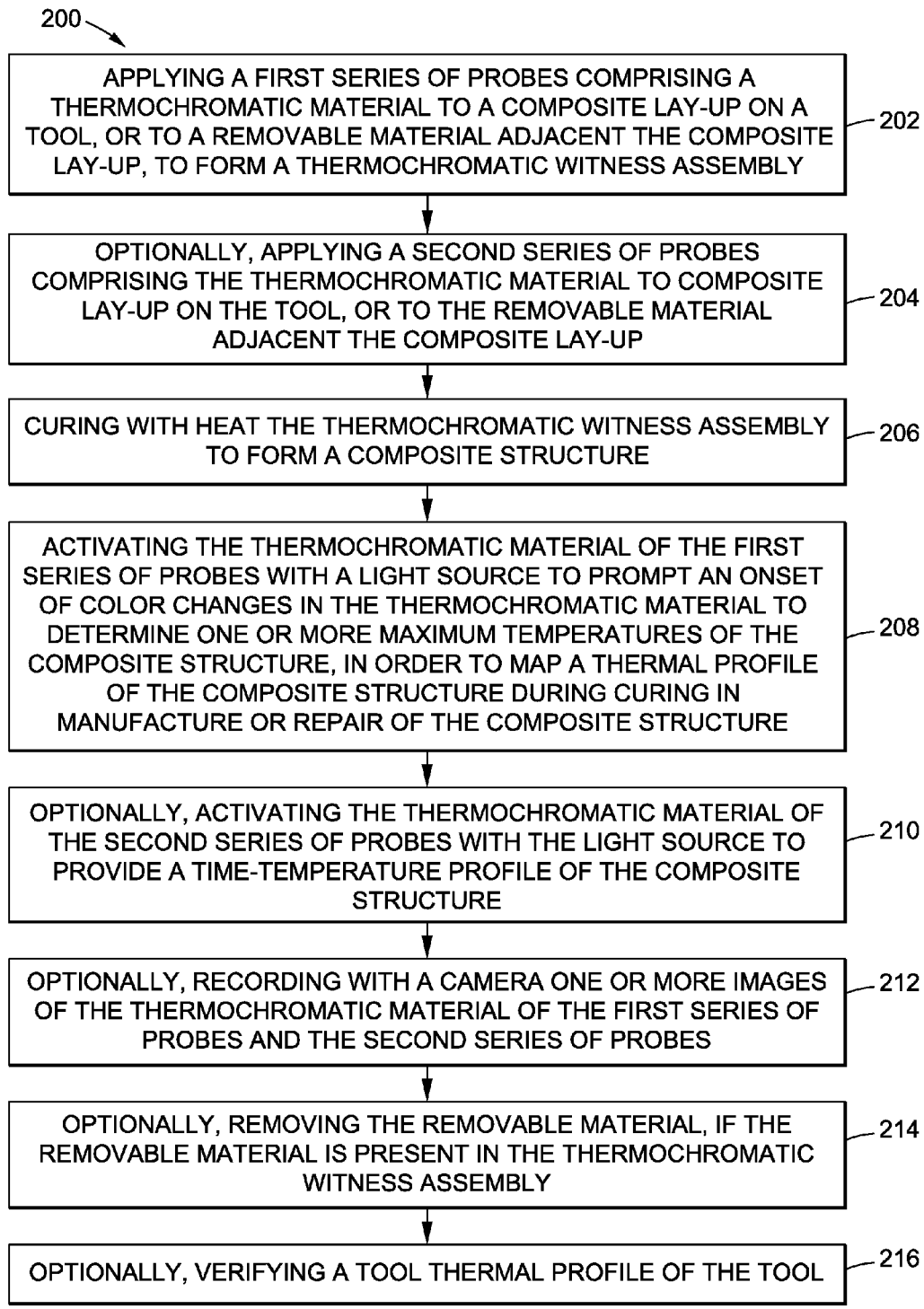
FIG. 9 is a flow diagram showing an embodiment of a method of the disclosure.

In another embodiment, as shown in FIG. 9, there is provided a method 200 to map a thermal profile 62 (see FIG. 4) of a composite structure 28 (see FIG. 4) during curing in at least one of manufacture of the composite structure 28, or repair of the composite structure 28. "At least one of" may mean only manufacture of the composite structure 28, or only repair of the composite structure 28, or a combination of manufacture of the composite structure 28 and repair of the composite structure 28 (see FIG. 4). FIG. 9 is a flow diagram showing an embodiment of the method 200 of the disclosure.

As shown in FIG. 9, the method 200 comprises step 202 of applying a first series of probes 66a (see FIG. 4) comprising a thermochromatic material 68 (see FIG. 4) either to a composite lay-up 70 (see FIG. 4) on a tool 90 (see FIG. 4), and preferably to a surface 74 (see FIG. 4) of the composite lay-up 70 (see FIG. 4), or to a removable material 72 (see FIG. 4) adjacent the composite lay-up 70 (see FIG. 4), and preferably to a surface 76 (see FIG. 4) of the removable material 72 (see FIG. 4), to form a thermochromatic witness assembly 64 (see FIGS. 4, 6A-6E). The step 202 of applying the first series of probes 66a (see FIG. 4) further comprises the step of applying the first series of probes 66a (see FIG. 4) to the removable material 72 (see FIG. 4), which comprises at least one of a peel ply 72a (see FIGS. 4, 6A), a release film 72b (see FIG. 4), a fluorinated ethylene propylene (FEP) film 72c (see FIG. 4), or a caul plate 72d (see FIG. 4), adjacent the composite lay-up 70 (see FIG. 4).

As shown in FIG. 9, the method 200 may further comprise optional step 204 of applying a second series of probes 66b (see FIG. 4) comprising the thermochromatic material 68 (see FIG. 4) either to the composite lay-up 70 (see FIG. 4), and preferably to the surface 74 (see FIG. 4) of the composite lay-up 70 (see FIG. 4), or to the removable material 72 (see FIG. 4) adjacent the composite lay-up 70 (see FIG. 4), and preferably to the surface 76 (see FIG. 4) of the removable material 72 (see FIG. 4). The step 202 of applying the first series of probes 66a and the optional step 204 of applying the second series of probes 66b may comprise either by spraying, or mixing into a pre-preg resin 78 of the composite lay-up 70 to form a thermochromatic resin 80, or another suitable application method.

As shown in FIG. 9, the method 200 further comprises step 206 of curing with heat 110 (see FIG. 4) the thermochromatic witness assembly 64 (see FIGS. 4, 6A-6E) to form the composite structure 28 (see FIG. 4). The cure time, cure temperature and cure pressure depend on the materials of the composite lay-up 70 and the resin system used.

As shown in FIG. 9, the method 200 further comprises step 208 of activating the thermochromatic material 68 (see FIG. 4) of the first series of probes 66a (see FIG. 4) with a light source 112 (see FIGS. 4, 8) to prompt an onset of color changes 114 (see FIG. 4) in the thermochromatic material 68 (see FIG. 4) to determine one or more maximum temperatures 116 (see FIG. 4) of the composite structure 28 (see FIG. 4), in order to map the thermal profile 62 (see FIG. 4) of the composite structure 28 (see FIG. 4) during curing in at least one of the manufacture of the composite structure 28 (see FIG. 4), or repair of the composite structure 28 (see FIG. 4).

The step 208 of activating the thermochromatic material 68 (see FIG. 4) further comprises activating the thermochromatic material 68 (see FIG. 4) of the first series of probes 66a (see FIG. 4) with the light source 112 (see FIG. 4) to prompt the onset of color changes 114 (see FIG. 4) and retaining the color changes 114 (see FIG. 4) in the removable material 72 (see FIG. 4) for one or more hours after the composite structure 28 (see FIG. 4) returns to a nominal temperature 95 (see FIG. 4).

The step 208 of activating the thermochromatic material 68 (see FIG. 4) of the first series of probes 66a (see FIG. 4) with the light source 112 (see FIG. 4) further comprises activating the thermochromatic material 68 (see FIG. 4) of the first series of probes 66a (see FIG. 4) with the light source 112 (see FIG. 4) comprising an ultraviolet (UV) light source 112a (see FIG. 4), an infrared (IR) light source 112b (see FIG. 4), an optical light source 112c (see FIG. 4), or another suitable light source.

As shown in FIG. 9, the method 200 may further comprise optional step 210 of activating the thermochromatic material 68 of the second series of probes 66b with the light source 112 (see FIGS. 4, 8). The second series of probes 66b (see FIG. 4) is preferably configured to provide a time-temperature profile 118 (see FIG. 4) of the composite structure 28 (see FIG. 4).

As further shown in FIG. 9, the method 200 may further comprise after the step 208 of activating the thermochromatic material 68 (see FIG. 4) of the first series of probes 66a (see FIG. 4) or after the optional step 210 of activating the thermochromatic material 68 (see FIG. 4) of the second series of probes 66b (see FIG. 4), the optional step 212 of recording with a camera 120 (see FIGS. 4, 8) one or more images 122 (see FIGS. 4, 8) of the thermochromatic material 68 (see FIG. 4) of the first series of probes 66a (see FIG. 4) and the second series of probes 66b (see FIG. 4).

As further shown in FIG. 9, the method 200 may further comprise after the optional step 212 of recording with the camera 120 (see FIGS. 4, 8) one or more images 122 (see FIGS. 4, 8), the optional step 214 of removing the removable material 72 (see FIG. 4), if the removable material 72 (see FIG. 4) is present in the thermochromatic witness assembly 64 (see FIGS. 4, 6A-6E).

As further shown in FIG. 9, the method 200 may further comprise the optional step 216 of verifying a tool thermal profile 138 (see FIG. 4) of the tool 90 (see FIG. 4). The optional step 216 of verifying the tool thermal profile 138 (see FIG. 4) preferably comprises the steps of applying the first series of probes 66a (see FIG. 4) comprising the thermochromatic material 68 (see FIG. 4) to a surface 96 (see FIG. 4) of the tool 90 (see FIG. 4) and activating the thermochromatic material 68 (see FIG. 4) of the first series of probes 66a (see FIG. 4) with the light source 112 (see FIG. 4) to verify the tool thermal profile 138 (see FIG. 4) of the tool 90 (see FIG. 4). The optional step 216 of verifying the tool thermal profile 138 (see FIG. 4) may further comprise the steps of applying the second series of probes 66b (see FIG. 4) comprising the thermochromatic material 68 (see FIG. 4) to the surface 96 (see FIG. 4) of the tool 90 (see FIG. 4) and activating the thermochromatic material 68 (see FIG. 4) of the second series of probes 66b (see FIG. 4) with the light source 112 (see FIG. 4) to verify the tool thermal profile 138 (see FIG. 4) of the tool 90 (see FIG. 4).

Figure 10:
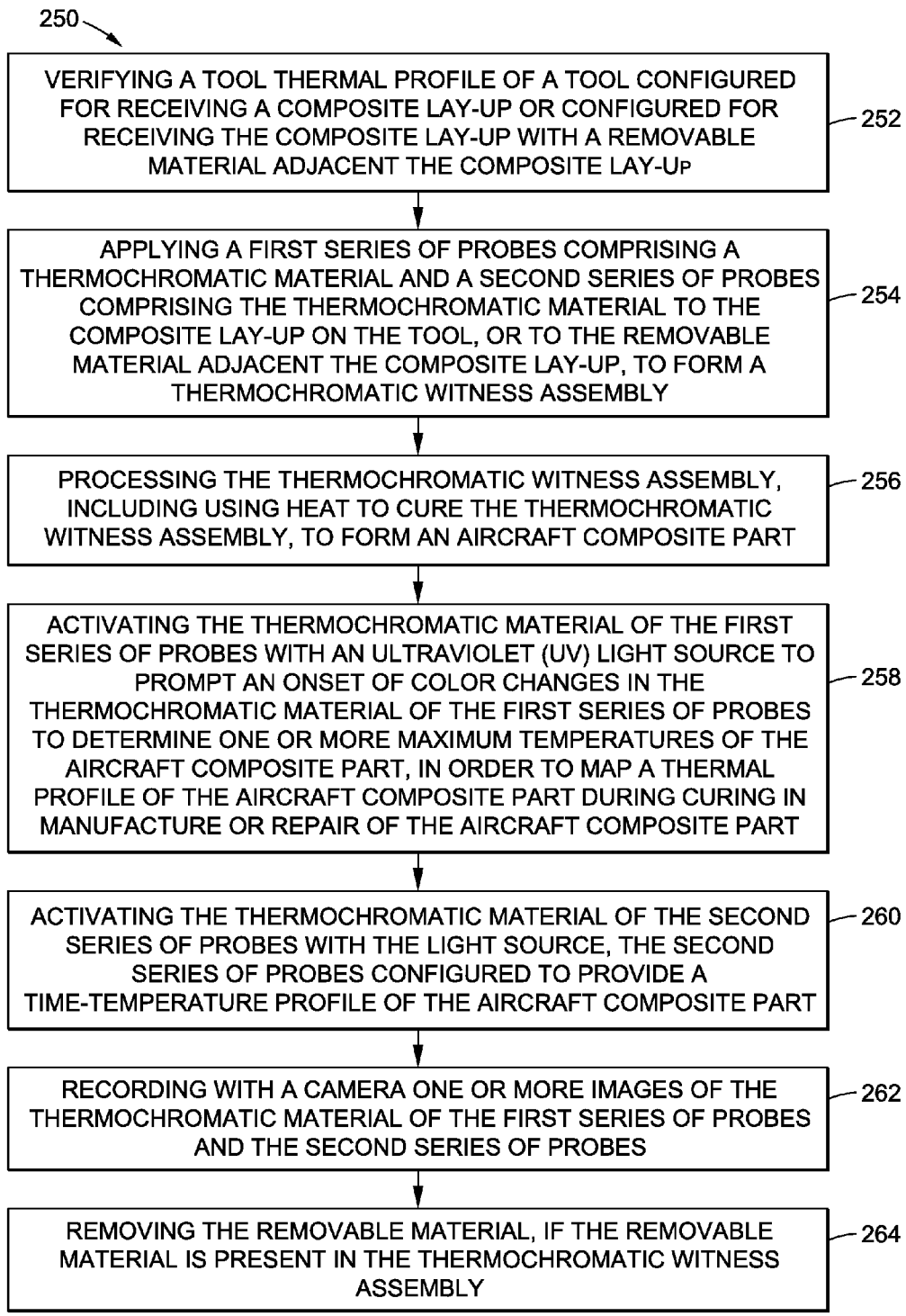
FIG. 10 is a flow diagram showing another embodiment of a method of the disclosure.

In another embodiment, as shown in FIG. 10, there is provided a method 250 to map a thermal profile 62 (see FIG. 4) of an aircraft composite part 28a (see FIG. 1) during curing in at least one of manufacture of the aircraft composite part 28a (see FIG. 1), or repair of the aircraft composite part 28a (see FIG. 1). "At least one of" may mean only manufacture of the aircraft composite part 28a, or only repair of the aircraft composite part 28a, or a combination of manufacture of the aircraft composite part 28a and repair of the aircraft composite part 28a (see FIG. 1). FIG. 10 is a flow diagram showing another embodiment of a method 250 of the disclosure.

As shown in FIG. 10, the method 250 comprises step 252 of verifying a tool thermal profile 138 (see FIG. 4) of a tool 90 see FIG. 4) configured for receiving a composite lay-up 70 see FIG. 4) or configured for receiving the composite lay-up 70 see FIG. 4) with a removable material 72 see FIG. 4) adjacent the composite lay-up 70 (see FIG. 4).

As shown in FIG. 10, the method 250 further comprises step 254 of applying a first series of probes 66a (see FIG. 4) comprising a thermochromatic material 68 (see FIG. 4) and a second series of probes 66b (see FIG. 4) comprising the thermochromatic material 68 (see FIG. 4) either to a composite lay-up 70 (see FIG. 4) on the tool 90 (see FIG. 4), and preferably to a surface 74 (see FIG. 4) of the composite lay-up 70 (see FIG. 4), or to a removable material 72 (see FIG. 4) adjacent the composite lay-up 70 (see FIG. 4), and preferably to a surface 76 (see FIG. 4) of the removable material 72 (see FIG. 4), to form a thermochromatic witness assembly 64 (see FIG. 4).

As shown in FIG. 10, the method 250 further comprises step 256 of processing the thermochromatic witness assembly 64, including using heat 110 (see FIG. 4) to cure the thermochromatic witness assembly 64 (see FIG. 4), to form the aircraft composite part 28a (see FIG. 1). The cure time, cure temperature and cure pressure depend on the materials of the composite lay-up 70 and the resin system used.

As shown in FIG. 10, the method 250 further comprises step 258 of activating the thermochromatic material 68 (see FIG. 4) of the first series of probes 66a (see FIG. 4) with an ultraviolet (UV) light source 112a (see FIG. 4) to prompt an onset of color changes 114 (see FIG. 4) in the thermochromatic material 68 (see FIG. 4) of the first series of probes 66a (see FIG. 4) to determine one or more maximum temperatures 116 (see FIG. 4) of the aircraft composite part 28a (see FIG. 1), in order to map the thermal profile 62 (see FIG. 4) of the aircraft composite part 28a (see FIG. 1) during curing in at least one of manufacture or repair of the aircraft composite part 28a (see FIG. 1).

As shown in FIG. 10, the method 250 further comprises step 260 of activating the thermochromatic material 68 (see FIG. 4) of the second series of probes 66b (see FIG. 4) with the light source 112 (see FIG. 4), the second series of probes 66b (see FIG. 4) configured to provide a time-temperature profile 118 (see FIG. 4) of the aircraft composite part 28a (see FIG. 1).

As shown in FIG. 10, the method 250 further comprises step 262 of recording with a camera 120 (see FIG. 8) one or more images 122 (see FIG. 8) of the thermochromatic material 68 (see FIG. 4) of the first series of probes 66a (see FIG. 4) and the second series of probes 66b (see FIG. 4). As shown in FIG. 10, the method 250 further comprises step 264 of removing the removable material 72 (see FIG. 4), if the removable material 72 is present in the thermochromatic witness assembly 64 (see FIG. 4).

Disclosed embodiments of the system 10 (see FIG. 4), the method 200 (see FIG. 9), and the method 250 (see FIG. 10) address a need to understand and control the thermal profile 62 (see FIG. 4) of a composite structure 28 (see FIG. 4), such as in the form of an aircraft composite part 28a (see FIG. 4) over a desired area. Moreover, the system 10 (see FIG. 4), the method 200 (see FIG. 9), and the method 250 (see FIG. 10) provide a system 10 and methods 200, 250 to map the thermal profile 62 (see FIG. 4) or thermal history of a composite structure 28 during the curing process and to streamline the thermal mapping composite fabrication process.

In addition, disclosed embodiments of the system 10 (see FIG. 4), the method 200 (see FIG. 9), and the method 250 (see FIG. 10) apply to repair processes for composite structures 28 (see FIG. 1), as well as manufacturing processes for composite structures 28 (see FIG. 1). Further, disclosed embodiments of the system 10 (see FIG. 4), the method 200 (see FIG. 9), and the method 250 (see FIG. 10) may reduce the cost and time to develop and manufacture composite structures 28 (see FIGS. 1, 4) and related tooling and curing processes, while optimizing composite structures 28 (see FIG. 1, 4), such as aircraft composite parts 28a, and design of the tool 90 (see FIG. 4).

In addition, disclosed embodiments of the system 10 (see FIG. 4), the method 200 (see FIG. 9), and the method 250 (see FIG. 10) may apply the thermochromatic material 68 (see FIG. 4) to a removable material 72, such as a peel ply 72a, a release film 72b (see FIG. 4), an FEP film 72c (see FIG. 4), or a caul plate 72d (see FIG. 4). Moreover, the thermochromatic material 68 (see FIG. 4) may be applied directly to developmental parts 92 (see FIG. 4) to quickly determine temperature profiles 94 (see FIG. 4) and to guide tool 90 (see FIG. 4) design. Further, the thermochromatic material 68 (see FIG. 4) may be applied directly to the surface 96 (see FIG. 4) of the tool 90 used for lay-up to verify tool heating during development and manufacture. The thermochromatic material 68 (see FIG. 4) may also be applied outside of aircraft composite part 28a (see FIGS. 1, 4) areas for in-process monitoring and validation of the cure cycle.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A system to map a thermal profile of a composite structure during curing in at least one of manufacture of the composite structure, or repair of the composite structure, the system comprising:
   a thermochromatic witness assembly comprising a first series of probes comprising a thermochromatic material either applied directly to a surface of a composite lay-up on a tool, applied directly to a surface of the tool, or applied directly to a surface of a removable material adjacent the composite lay-up;
   a process assembly with a heat source configured to cure the thermochromatic witness assembly to form the composite structure; and,
   a light source configured to activate the thermochromatic material of the first series of probes to prompt an onset of color changes in the thermochromatic material to determine one or more maximum temperatures of the composite structure, in order to map the thermal profile of the composite structure during curing in at least one of manufacture of the composite structure, or repair of the composite structure.

2. The system of claim 1 wherein the thermochromatic witness assembly further comprises a second series of probes comprising the thermochromatic material either applied directly to the surface of the composite lay-up on the tool, applied directly to the surface of the tool, or applied directly to the surface of the removable material adjacent the composite lay-up.

3. The system of claim 2 wherein the light source is configured to activate the thermochromatic material of the second series of probes to provide a time-temperature profile.

4. The system of claim 2 further comprising a sprayer apparatus to apply the first series of probes and the second series of probes of the thermochromatic material either directly to the surface of the composite lay-up on the tool, directly to the surface of the tool, or directly to the surface of the removable material adjacent the composite lay-up.

5. The system of claim 3 further comprising a camera to record one or more images of the thermochromatic material of the first series of probes and the second series of probes after activation with the light source.

6. The system of claim 1 wherein the removable material comprises at least one of a peel ply, a release film, a fluorinated ethylene propylene (FEP) film, or a caul plate.

7. The system of claim 1 wherein the light source comprises at least one of an ultraviolet (UV) light source, an infrared (IR) light source, or an optical light source.

8. The system of claim 2 further comprising a tool verification assembly configured to verify a tool thermal profile of a tool, the tool verification assembly comprising:

the tool configured for receiving the composite lay-up or the composite lay-up with the removable material adjacent the composite lay-up;

the first series of probes comprising the thermochromatic material, or the first series of probes and the second series of probes comprising the thermochromatic material, applied to the surface of the tool; and, the light source configured to activate the thermochromatic material of the first series of probes, or the first series of probes and the second series of probes, to verify the tool thermal profile of the tool.

9. A method to map a thermal profile of a composite structure during curing in at least one of manufacture of the composite structure, or repair of the composite structure, the method comprising the steps of:

applying a first series of probes comprising a thermochromatic material either directly to a surface of a composite lay-up on a tool, directly to a surface of the tool, or directly to a surface of a removable material adjacent the composite lay-up, to form a thermochromatic witness assembly;

curing with heat the thermochromatic witness assembly to form the composite structure; and activating the thermochromatic material of the first series of probes with a light source to prompt an onset of color changes in the thermochromatic material to determine one or more maximum temperatures of the composite structure, in order to map the thermal profile of the composite structure during curing in at least one of manufacture of the composite structure, or repair of the composite structure.

10. The method of claim 9 wherein the applying the first series of probes further comprises applying a second series of probes comprising the thermochromatic material either directly to the surface of the composite lay-up on the tool, directly to the surface of the tool, or directly to the surface of the removable material adjacent the composite lay-up.

11. The method of claim 10 wherein the activating the thermochromatic material of the first series of probes further comprises activating the thermochromatic material of the second series of probes with the light source, the second series of probes configured to provide a time-temperature profile of the composite structure.

12. The method of claim 10 wherein the applying the first series of probes and the applying the second series of probes comprise either by spraying, or mixing into a pre-preg resin of the composite lay-up.

13. The method of claim 11 wherein the thermochromatic material is applied directly to the surface of the removable material adjacent the composite lay-up, and wherein the method further comprises after the activating the thermochromatic material of the first series of probes, or after the activating the thermochromatic material of the second series of probes, recording with a camera one or more images of the thermochromatic material of the first series of probes and the second series of probes, and removing the removable material.

14. The method of claim 9 further comprising verifying a tool thermal profile of the tool.

15. The method of claim 9 wherein the applying the first series of probes further comprises applying the first series of probes directly to the surface of the removable material adjacent the composite lay-up, the removable material comprising at least one of a peel ply, a release film, a fluorinated ethylene propylene (FEP) film, and a caul plate, adjacent the composite lay-up.

16. The method of claim 9 wherein the activating the thermochromatic material further comprises activating the thermochromatic material of the first series of probes with the light source to prompt the onset of color changes and retaining the color changes in the removable material for one or more hours after the composite structure returns to a nominal temperature.

17. The method of claim 9 wherein the activating the thermochromatic material of the first series of probes with the light source further comprises activating the thermochromatic material of the first series of probes with the light source which comprises at least one of an ultraviolet (UV) light source, an infrared (IR) light source, or an optical light source.

18. A method to map a thermal profile of an aircraft composite part during curing in at least one of manufacture of the aircraft composite part, or repair of the aircraft composite part, the method comprising the steps of:

verifying a tool thermal profile of a tool configured for receiving a composite lay-up or configured for receiving the composite lay-up with a removable material adjacent the composite lay-up;

applying a first series of probes comprising a thermochromatic material and a second series of probes comprising the thermochromatic material either directly to a surface of the composite lay-up on the tool, directly to a surface of the tool, or directly to a surface of the removable material adjacent the composite lay-up, to form a thermochromatic witness assembly;

processing the thermochromatic witness assembly, including using heat to cure the thermochromatic witness assembly, to form the aircraft composite part;

activating the thermochromatic material of the first series of probes with an ultraviolet (UV) light source to prompt an onset of color changes in the thermochromatic material of the first series of probes to determine one or more maximum temperatures of the aircraft composite part, in order to map the thermal profile of the aircraft composite part during curing in at least one of manufacture of the aircraft composite part, or repair of the aircraft composite part;

activating the thermochromatic material of the second series of probes with the light source, the second series of probes configured to provide a time-temperature profile of the aircraft composite part; and recording with a camera one or more images of the thermochromatic material of the first series of probes and the second series of probes.

19. The method of claim 18 wherein the verifying the tool thermal profile of the tool comprises applying the first series of probes, or the first series of probes and the second series of probes, directly to the surface of the tool, and activating the thermochromatic material of the first series of probes, or the first series of probes and the second series of probes, with the light source to verify the tool thermal profile of the tool.

20. The method of claim 18 wherein the applying the first series of probes and the second series of probes further comprises applying the first series of probes and the second series of probes directly to the surface of the removable material adjacent the composite lay-up, the removable material comprising at least one of a peel ply, a release film, a fluorinated ethylene propylene (FEP) film, or a caul plate, adjacent the composite lay-up.

* * * * *